(12) United States Patent
Ristau et al.

(10) Patent No.: US 11,339,670 B2
(45) Date of Patent: May 24, 2022

(54) PART-SPAN SHROUD CONFIGURATIONS

(71) Applicant: General Electric Company, Schenectady, NY (US)

(72) Inventors: Neil Devin Ristau, Simpsonville, SC (US); Michael Anthony Wondrasek, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/069,434

(22) Filed: Oct. 13, 2020

(65) Prior Publication Data

US 2022/0112811 A1 Apr. 14, 2022

(51) Int. Cl.
*F01D 5/22* (2006.01)
*F01D 5/14* (2006.01)

(52) U.S. Cl.
CPC .............. *F01D 5/225* (2013.01); *F01D 5/141* (2013.01); *F05D 2220/32* (2013.01); *F05D 2240/24* (2013.01)

(58) Field of Classification Search
CPC .................................. F01D 5/225; F01D 5/141
See application file for complete search history.

(56) References Cited

U.S. PATENT DOCUMENTS

| | | | |
|---|---|---|---|
| 8,105,038 B2 | 1/2012 | Ootomo et al. | |
| 9,546,555 B2 | 1/2017 | Chouhan et al. | |
| 9,822,647 B2 * | 11/2017 | Subbareddyar | F01D 5/225 |
| 2009/0104023 A1 * | 4/2009 | Favray | F02C 6/12 |
| | | | 415/160 |
| 2014/0154081 A1 | 6/2014 | Chouhan | |
| 2015/0176413 A1 | 6/2015 | Weber et al. | |

* cited by examiner

*Primary Examiner* — Ninh H. Nguyen
*Assistant Examiner* — John S Hunter, Jr.
(74) *Attorney, Agent, or Firm* — Charlotte Wilson; Hoffman Warnick LLC (57) ABSTRACT

A blade airfoil including a platform, concave pressure sidewall and convex suction sidewall extending axially between corresponding leading and trailing edges and radially between a root and outboard tip. The blade further includes at least one part-span shroud positioned on the airfoil defined by a nominal profile in accordance with at least a portion of Cartesian coordinate values of X, Y and Z set forth in at least one of TABLE I and TABLE II. The Cartesian coordinate values are non-dimensional values of from 0% to 100% convertible to distances by multiplying values by a length of the at least one part-span shroud. X and Y values are connected by continuing arcs to define part-span shroud profile sections at each distance Z along at least a portion of the at least one part-span shroud, profile sections at Z distances being joined with one another to form the nominal profile.

17 Claims, 8 Drawing Sheets

PART-SPAN SHROUD CONFIGURATIONS

BACKGROUND OF THE INVENTION

The present embodiments relate generally to apparatus, methods and/or systems concerning turbine rotor blades. More specifically, but not by way of limitation, the present application relates to apparatus and assemblies pertaining to turbine rotor blades having multiple part-span shrouds.

BRIEF DESCRIPTION OF THE INVENTION

The present embodiments set forth a blade with at least one part-span shroud for use in a turbine. The blade includes an airfoil including a platform, a concave pressure sidewall and a convex suction sidewall extending axially between corresponding leading and trailing edges and radially between a root and an outboard tip. The blade further includes at least one part-span shroud positioned on the airfoil, the at least one outboard part-span shroud being defined by a nominal profile substantially in accordance with at least a portion of Cartesian coordinate values of X, Y and Z set forth in at least one of TABLE I and TABLE II, wherein the Cartesian coordinate values are non-dimensional values of from 0% to 100% convertible to distances by multiplying the values by a length of the at least one part-span shroud expressed in units of distance, and wherein X and Y values connected by smooth continuing arcs define the at least one part-span shroud profile sections at each distance Z along at least a portion of the at least one part-span shroud, the profile sections at the Z distances being joined smoothly with one another to form the nominal profile.

A further aspect of the embodiments provides a blade that includes an airfoil including a platform, a concave pressure sidewall and a convex suction sidewall extending axially between corresponding leading and trailing edges and radially between a root and an outboard tip, the blade further including at least one part-span shroud positioned on the airfoil, the trailing edge of the at least one outboard part-span shroud being defined by $x^2/a^2+y^2/b^2=1$, where a represents half the length of the major axis while b represents half the length of the minor axis, and a:b is in a range from about 10:1 to about 1:1.

Another aspect of the embodiments provides an airfoil including a platform, a concave pressure sidewall and a convex suction sidewall extending axially between corresponding leading and trailing edges and radially between a root and an outboard tip. The blade further including an outboard part-span shroud and an inboard part-span shroud positioned on the airfoil, wherein the outboard part-span shroud is defined by a nominal profile substantially in accordance with at least a portion of Cartesian coordinate values of X, Y and Z set forth in TABLE I, and the inboard part-span shroud is defined by a nominal profile substantially in accordance with at least a portion of Cartesian coordinate values of X, Y and Z set forth in TABLE II. The Cartesian coordinate values are non-dimensional values of from 0% to 100% convertible to distances by multiplying the values by a length of the at least one part-span shroud expressed in units of distance, and wherein X and Y values connected by smooth continuing arcs define the at least one part-span shroud profile sections at each distance Z along at least a portion of the at least one part-span shroud, the profile sections at the Z distances being joined smoothly with one another to form the nominal profile. Each of the outboard part-span shroud and an inboard part-span shroud include an elliptical trailing edge, and wherein each elliptical trailing edge is defined by $x^2/a^2+y^2/b^2=1$, where a represents half the length of the major axis while b represents half the length of the minor axis These and other features of the present application will become apparent upon review of the following detailed description of the preferred embodiments when taken in conjunction with the drawings and the appended claims.

The illustrative aspects of the present disclosure are designed to solve the problems herein described and/or other problems not discussed.

BRIEF DESCRIPTION OF THE DRAWINGS

These and other features of this embodiments will be more completely understood and appreciated by careful study of the following more detailed description of illustrative embodiments taken in conjunction with the accompanying drawings, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, it will be appreciated that to discuss the disclosure of the present application, it may be necessary to select terminology to refer to and describe particular components within a combustion turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as being single part may include and be referenced in another context as consisting of multiple components, or, what may be described herein as including multiple components may be referred to elsewhere as a single part. As such, in understanding the scope of the present disclosure, attention should not only be paid to the terminology and description provided herein, but also to the structure, configuration, function, and/or usage of the component, particularly as provided in the appended claims.

In addition, several descriptive terms may be used regularly herein, and it should prove helpful to define these terms at the onset of this section. Accordingly, these terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. As such, the term "downstream" corresponds to the direction of flow of the fluid, and the term "upstream" refers to the direction opposite to the flow. The terms "forward" and "aft", without any further specificity, refer to directions, with "forward" referring to the forward or compressor end of the engine, and "aft" referring to the aft or turbine end of the engine. The term "radial" refers to movement or position perpendicular to an axis. It is often required to describe parts that are at differing radial positions with regard to a center axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine, or, when referring to components within a combustor, the center axis of the combustor.

In a combustion turbine engine, it is well known that air pressurized in a compressor is used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disc. Each blade typically includes a dovetail that permits assembly and disassembly of the blade in a corresponding dovetail slot in the rotor disc, as well as an airfoil that extends radially outwardly from the dovetail and interacts with the flow of the working fluid through the engine. The airfoil has a generally concave pressure side and generally convex suction side extending axially between corresponding leading and trailing edges and radially between a root and a tip. It will be understood that the blade tip is spaced closely to a radially outer stationary shroud for minimizing leakage therebetween of the combustion gases flowing downstream between the turbine blades.

Shrouds at the tip of the airfoil (tip shrouds) are often implemented on aft stages or rotor blades to provide damping and reduce the over-tip leakage of the working fluid. Given the length of the rotor blades in the aft stages, the damping function of the tip shrouds provides a significant performance benefit. However, taking full advantage of the damping function may be difficult considering the weight that the tip shroud adds to the assembly and the other criteria, which include enduring thousands of hours of operation exposed to high temperatures and extreme mechanical loads. Thus, while large tip shrouds are desirable because they seal the gas path more effectively and may provide significant connection between neighboring rotor blades, which may improve damping, larger tip shrouds may increase load on the rotor blade.

Output and efficiency of gas turbine engines improve as the size of the engine and, more specifically, the amount of air able to pass through it increase. The size of the engine, however, is limited by operable length of the turbine blades, with longer turbine rotor blades enabling enlargement of the flow path through t h e engine. Longer rotor blades, though, incur increased mechanical loads, which place further demands on the blades and the rotor disc that holds them. Longer rotor blades m a y also decrease the natural vibrational frequencies of the blades during operation, which increases the vibratory response of the rotor blades. Additional vibratory load may place demands on t h e rotor blade, which may further shorten the life of the component and, in some cases, may cause vibratory loads. One way to address the vibratory load of longer rotor blades is through shrouds that connect adjacent rotor blades to each other.

Another way to address this vibrational load is to position one or more shrouds lower on the airfoil of the rotor blade. That is, instead of adding the shroud to the tip of the rotor blade, shrouds can be positioned near the middle radial portion of the airfoil. As used herein, such shrouds will be referred to as "part span-shroud(s)." At this lower (or more inboard) radius, the mass of the shroud causes a reduced level of stress to the rotor blade. However, this type of shroud leaves a portion of the airfoil of the rotor blade that extends outboard of the part span-shroud unrestrained or cantilevered part span-shroud. This cantilevered portion of the airfoil typically results in lower frequency vibration and increased vibratory loads.

To address the vibration and load concerns, reducing an overall weight of the outboard portion of the blade may be beneficial. The reduction should also desirably alter the frequency and mode shape of the blade. This alteration will enhance blade and turbine efficiency.

Figure 1:
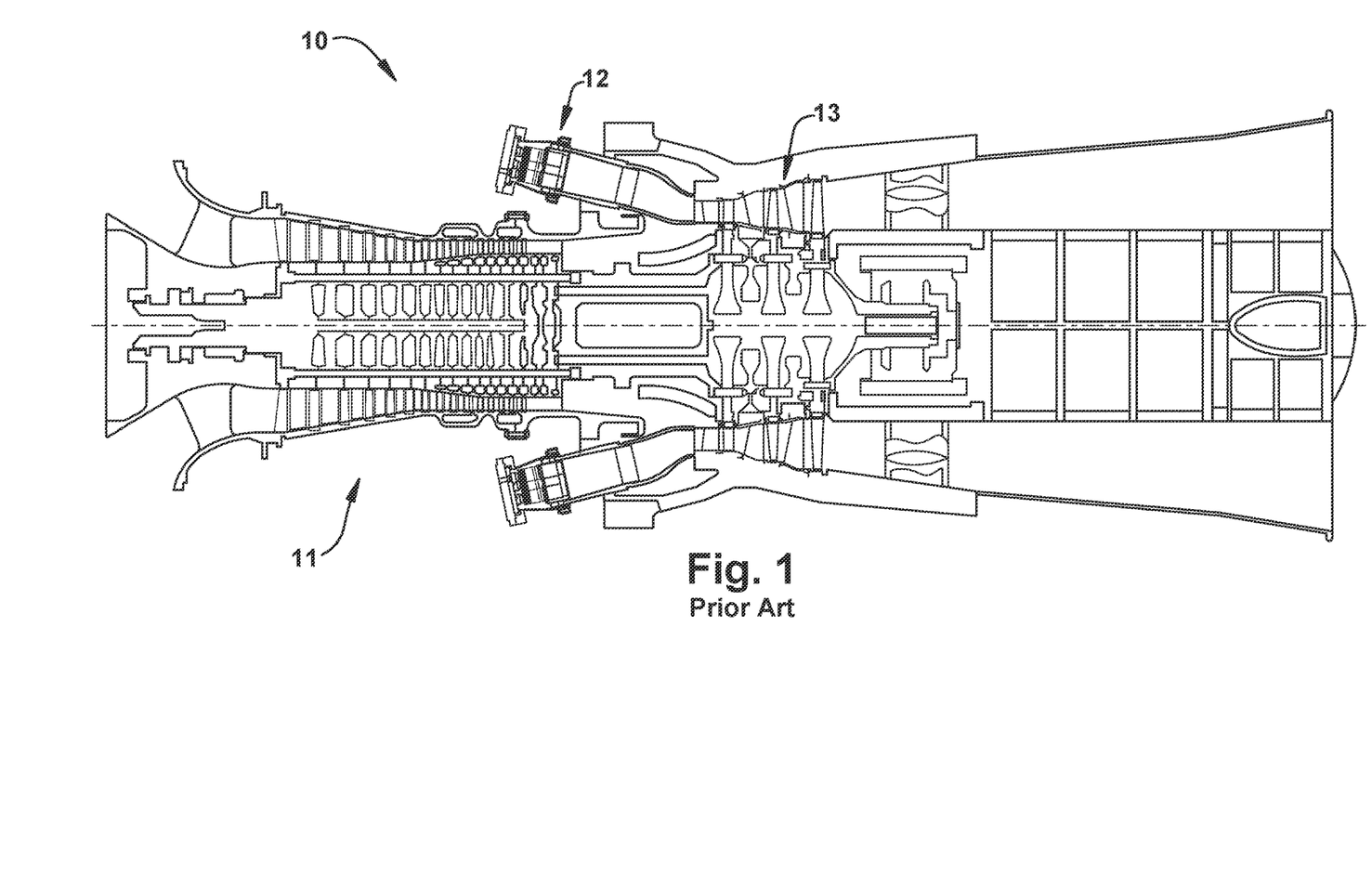
FIG. 1 is a schematic representation of an illustrative combustion turbine engine in which embodiments of the present application may be used.
Figure 2:
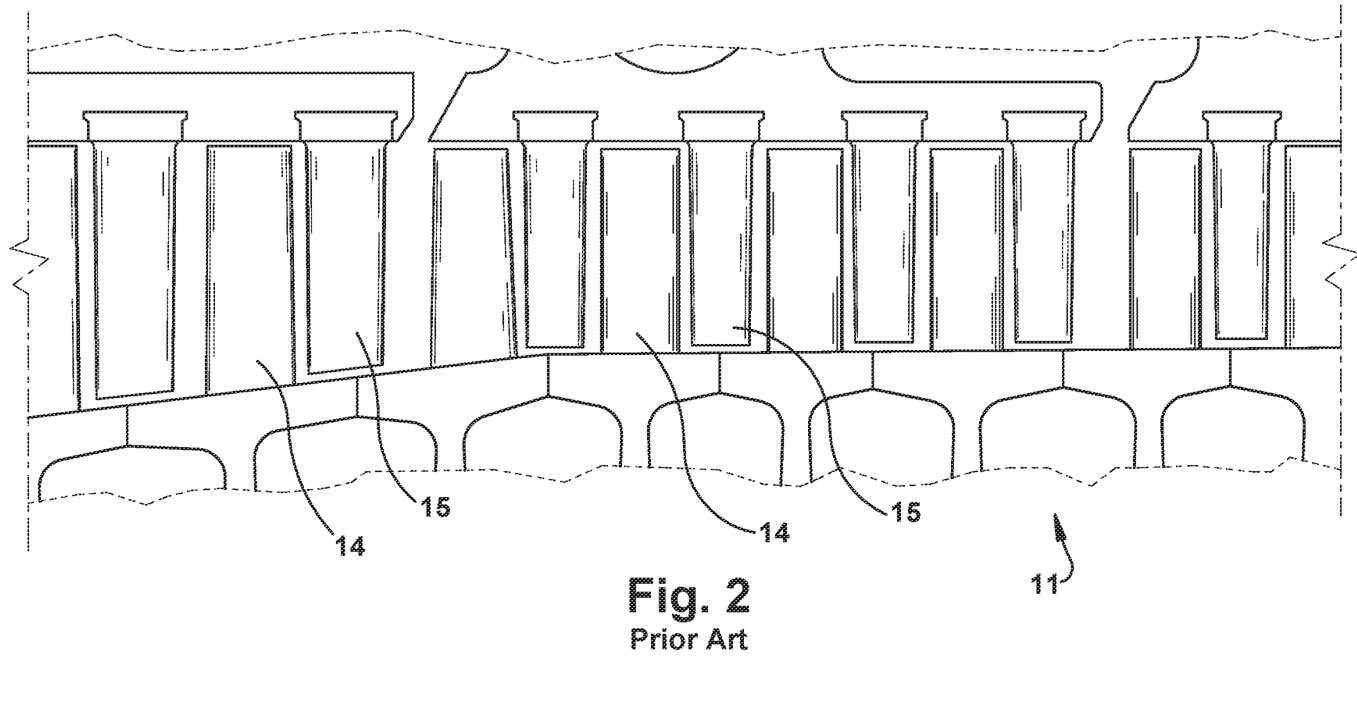
FIG. 2 is a sectional view of the compressor in the combustion turbine engine of FIG. 1.
Figure 3:
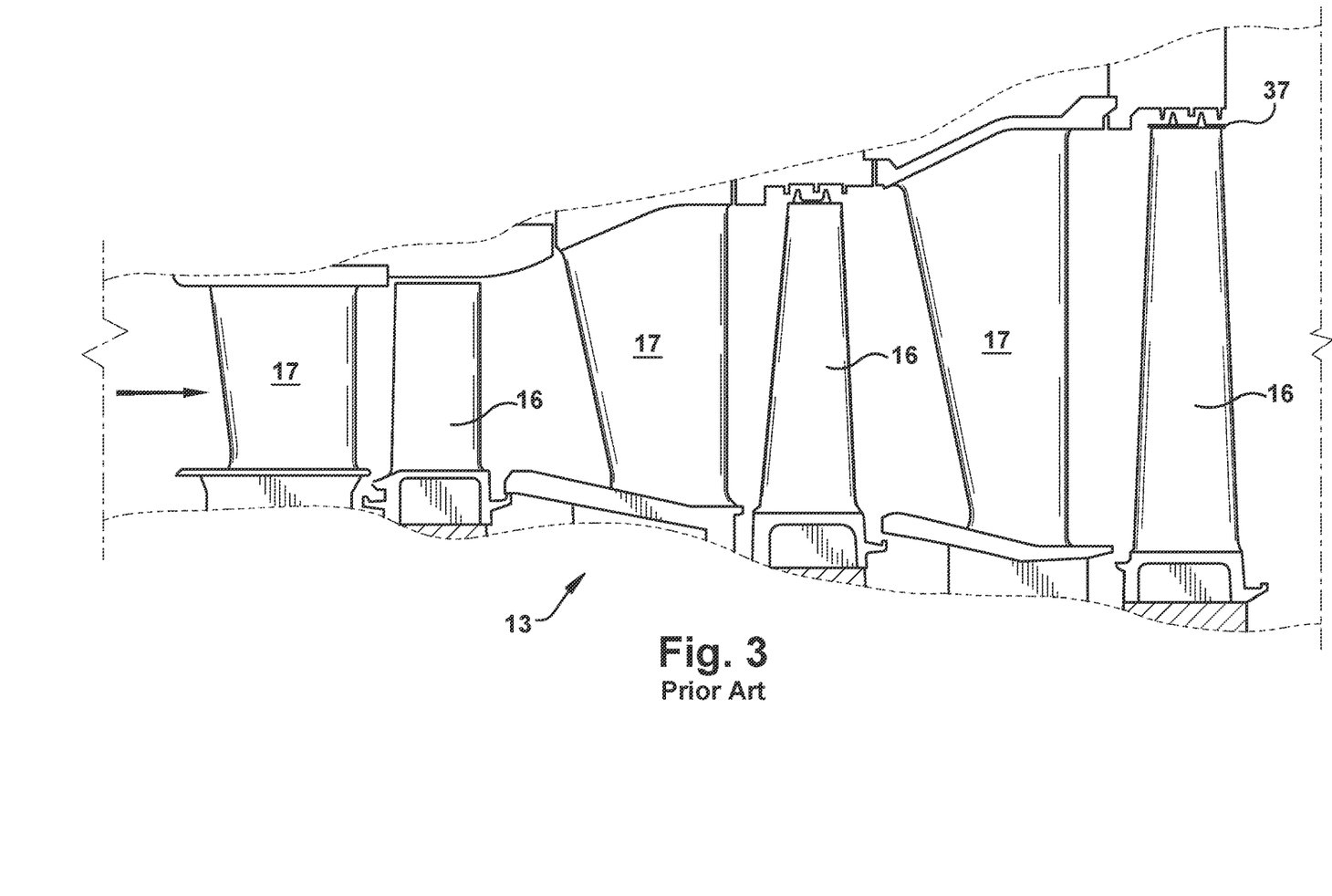
FIG. 3 is a sectional view of the turbine in the combustion turbine engine of FIG. 1.

By way of background, referring now to the Figures, FIGS. 1 through 3 show an illustrative combustion turbine engine in which embodiments of the present application may be used. It will be understood by those skilled in the art that the present embodiments are not limited to this type of usage. As stated, the present embodiments may be used in combustion turbine engines, such as the engines used in power generation and airplanes, steam turbine engines, and other type of rotary engines.

FIG. 1 illustrates an illustrative combustion turbine engine in which embodiments of the present application may be used. It will be understood by those skilled in the art that the present embodiments are not limited to this type of usage. As stated, the present embodiments may be used in combustion turbine engines, such as the engines used in power generation and airplanes, steam turbine engines, and other type of rotary engines. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between compressor 11 and turbine 13.

FIG. 2 illustrates a view of an illustrative, non-limiting, multi-staged axial compressor 11 that may be used in the combustion turbine engine of FIG. 1. As shown, compressor 11 may include a plurality of stages. Each stage may include a row of compressor rotor blades 14 followed by a row of compressor stator nozzles 15. Thus, a first stage may include a row of compressor rotor blades 14, which rotate about a central shaft, followed by a row of compressor stator nozzles 15, which remain stationary during operation. The compressor stator nozzles 15 generally are circumferentially spaced one from the other and fixed about the axis of rotation. The compressor rotor blades 14 are circumferentially spaced and attached to the shaft. When the shaft rotates during operation, compressor rotor blades 14 rotate with it. Compressor rotor blades 14 are configured such that, when spun about the shaft, they impart kinetic energy to the air or fluid flowing through compressor 11. Compressor 11 may have other stages beyond the stages that are illustrated in FIG. 2. Additional stages may include a plurality of circumferential spaced compressor rotor blades 14 followed by a plurality of circumferentially spaced compressor stator nozzles 15.

FIG. 3 illustrates a non-limiting, partial view of an illustrative turbine section or turbine 13 that may be used in the combustion turbine engine of FIG. 1. Turbine 13 also may include a plurality of stages. Three illustrative stages are illustrated, but this is merely illustrative and is non-limiting and not intended to restrict the embodiments in any manner. Accordingly, more or less stages may present in turbine 13. A first stage includes a plurality of turbine buckets or turbine rotor blades 16 (hereinafter "blades"), which rotate about the shaft during operation, and a plurality of nozzles or turbine stator blades 17 (hereinafter "nozzles"), which remain stationary during operation. Nozzles 17 generally are circumferentially spaced one from the other and fixed about the axis of rotation. Turbine rotor blades 16 may be mounted on a turbine wheel or disc (not shown) for rotation with the shaft (not shown). A second stage of turbine 13 also is illustrated. The second stage similarly includes a plurality of circumferentially spaced nozzles 17 followed by a plurality of circumferentially spaced turbine rotor blades 16, which are also mounted on a turbine wheel for rotation. A third stage also is illustrated, and similarly includes a plurality of nozzles 17 and rotor blades 16. It will be appreciated that nozzles 17 and turbine rotor blades 16 lie in the hot gas path of turbine 13. The direction of flow of the hot gases through the hot gas path is indicated by the arrow. Turbine 13 may have other stages beyond the stages that are illustrated in FIG. 3. Each additional stage may include a row of nozzles 17 followed by a row of turbine rotor blades 16.

In a non-limiting description of use, rotation of compressor rotor blades 14 within axial compressor 11 may compress a flow of air. In combustor 12, energy may be released when the compressed air is mixed with a fuel and ignited. The resulting flow of hot gases from combustor 12, which may be referred to as the working fluid, is then directed over turbine rotor blades 16, the flow of working fluid inducing the rotation of turbine rotor blades 16 and the shaft. Thereby, energy of the flow of working fluid is transformed into mechanical energy of the rotating blades and, because of the connection between the rotor blades and the shaft, the shaft rotates. The mechanical energy of the shaft may then be used to drive the rotation of compressor rotor blades 14, such that the necessary supply of compressed air is produced, and also, for example, a generator to produce electricity.

One way to modify a blade in light of loads thereon is to position a shroud lower on the airfoil of the blade. That is, instead of adding the shroud to the tip 37 (FIG. 3) of the blade, the shroud is positioned near the middle radial portion of the airfoil. As used herein, such a shroud will be referred to as a "part-span shroud." At this lower (or more inboard) radius, the mass of the shroud causes a reduced level of stress to the blade. However, this type of shroud may leave a portion of the airfoil of the blade unrestrained (i.e., that portion of the airfoil that extends outboard of the part-span shroud). This cantilevered portion of the airfoil can result in lower frequency vibration and increased vibratory loads. Accordingly, a blade configuration that reduces or limits loads would have value.

Figure 4:
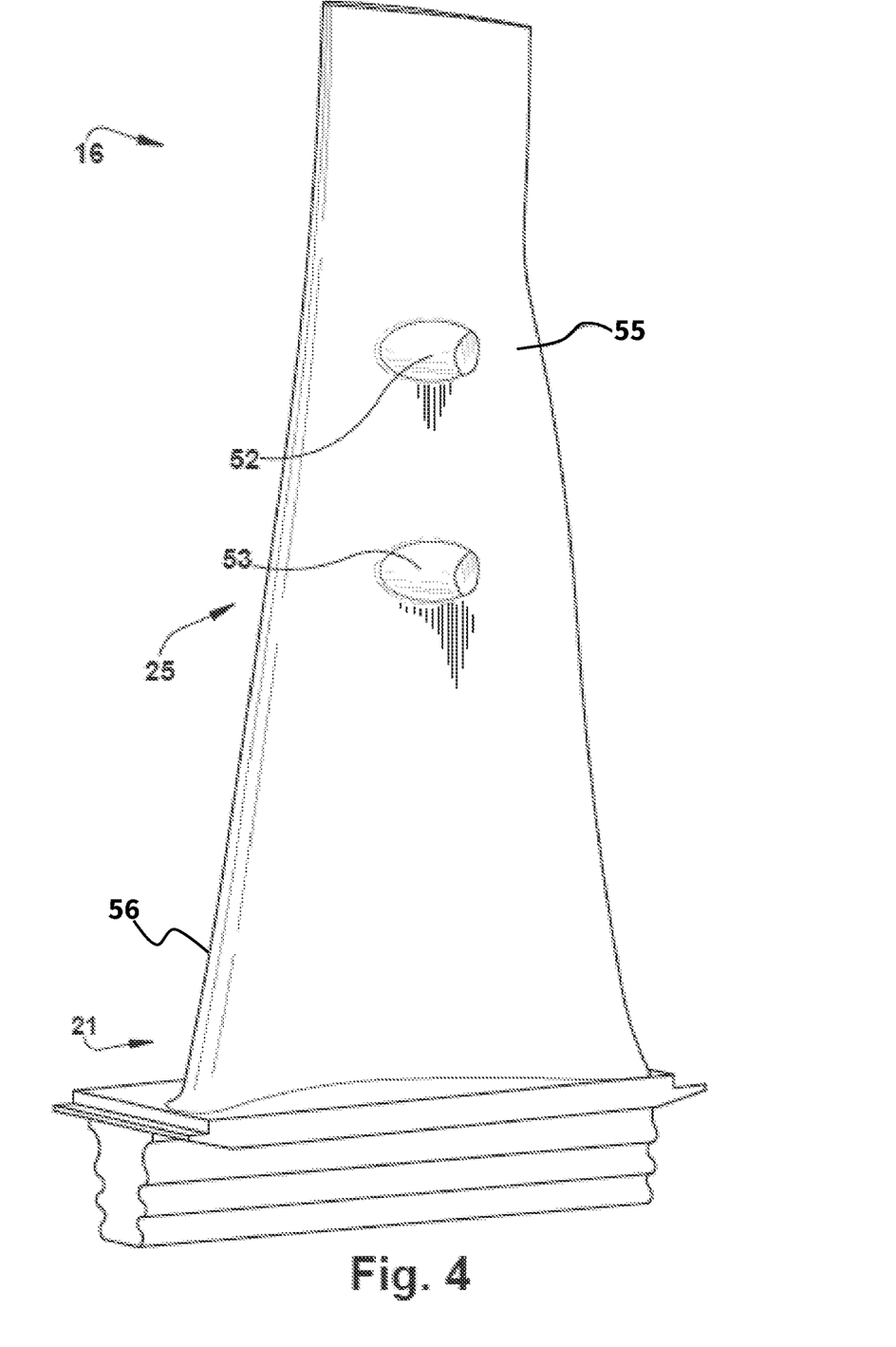
FIG. 4 is a schematic representation of an illustrative rotor blade having part-span shrouds, according to an embodiment of the present disclosure.

As illustrated in FIG. 4, the present embodiments describe a blade 16 with an airfoil 25 having dual part-span shrouds, an outboard part-span shroud 52 and an inboard part-span shroud 53. The airfoil 25 extends from a root 21, where the platform is essentially a planar platform with a fillet (not illustrated transitioning from the root 21 to the airfoil 25). The benefits of this part-span shroud arrangement are several, including an overall reduced tip mass as some of that mass is relocated closer to the axis of rotation, which reduces mechanical stress on the airfoil. Also, the part-span shroud configuration as embodied herein with an enhanced aerodynamic configuration as compared to non-aerodynamic configurations can reduce turbulent free flow to the nozzle 17 by the outboard part-span shroud 52 and inboard part-span shroud 53 to reduce mechanical stress and shock. Therefore, outboard part-span shroud 52 and inboard part-span shroud 53, as embodied by the disclosure with the aerodynamic configuration and elliptical trailing edge, can reduce pressure losses in turbine engine 10.

The inboard part-span shroud 53 may be configured as a circumferentially extending projection that protrudes from one or both of pressure sidewall 55 and suction sidewall 56 of airfoil 25. Similarly, outboard part-span shroud 52 may be configured as a circumferentially extending projection that protrudes from one or both of pressure sidewall 55 and suction sidewall 56 of airfoil 25. As previously discussed, each of the part-span shrouds may be configured to engage an adjacent part-span shroud formed on one or both neighboring blades upon installation. It will be appreciated that the dual points of contact can advantageously limit the vibratory response of blades during operation.

Outboard part-span shroud 52 and inboard part-span shroud 53 can be formed in a unitary configuration with blade 16. For example, but in no way limiting of the instant embodiments, each of outboard part-span shroud 52 and inboard part-span shroud 53 can be cast with blade 16 where outboard part-span shroud 52 and inboard part-span shroud 53 are fixed. Of course, if desired, outboard part-span shroud 52 and inboard part-span shroud 53 can be formed separate from blade 16 and then attached to airfoil 25 to form a unitary configuration by means such as but not limited to welding, brazing, or other such attachment means, known now or hereinafter developed.

Figure 5:
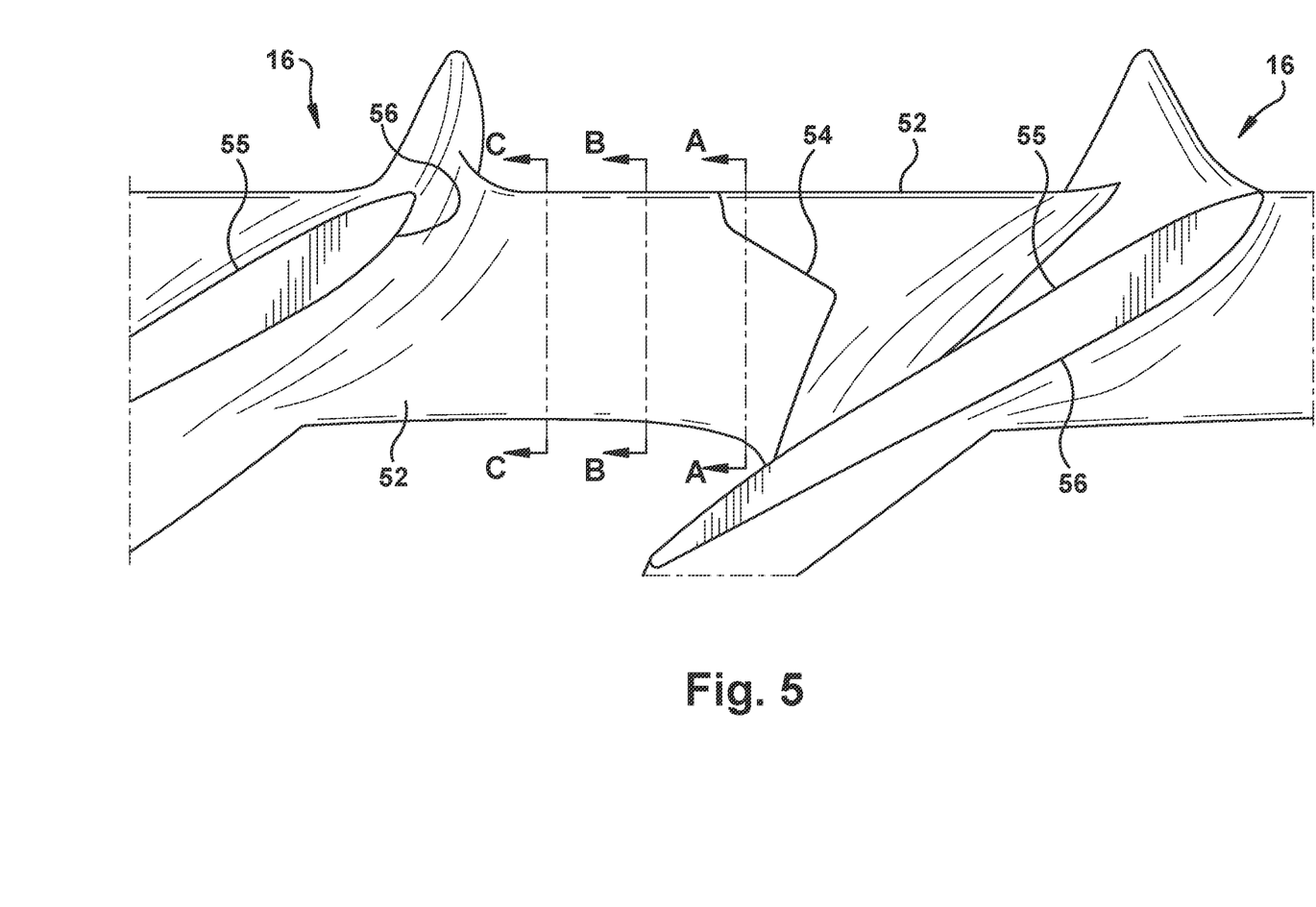
FIG. 5 is a top-view schematic representation of illustrative rotor blades having part-span shrouds engaged to adjacent part-span shrouds at interfaces, according to an embodiment of the present disclosure.

FIGS. 4 and 5 illustrate a side view and a top perspective view, respectively, of an illustrative turbine blade 16, which includes part-span shrouds 52 and 53, in accordance with embodiments of the disclosure. Part-span shrouds 52 and 53 are linking to and connecting to adjacent blades 16 at complementary part-span structures (best illustrated in FIG. 5). The linking of adjacent blades 16 may occur between a part-span shroud-to-part-span shroud interface 54 at which a pressure side surface 55 of the airfoil and a suction side surface face 56 of the airfoil contact each other. The part-span shroud to part-span shroud interfaces 54 illustrated herein are schematic and not illustrated in any particular configuration. The illustrated part-span shroud-to-part-span shroud interfaces 54 are merely illustrative and not intended to limit the embodiments in any manner. The linking of blades in this manner may increase the natural frequency of the assembly and damp operational vibrations, which means blades 16 are subject to less mechanical stress during operation and may degrade slowly, if they undergo stress and/or degrade at all.

As indicated in FIG. 4, outboard part-span shroud 52 may be positioned near an outboard tip of airfoil 25, while inboard part-span shroud 53 may be positioned near the radial mid-region of the airfoil 25. In an alternative embodiment, outboard part-span shroud 52 is positioned just inside of outboard tip of airfoil 25, and inboard part-span shroud 53 is positioned at approximately the mid-point of airfoil 25. In another embodiment, the radial positioning of the inboard and outboard part-span shrouds 52 is defined within a range of distances defined relative to airfoil 25. In one such embodiment, inboard part-span shroud 53 may be positioned within a range of radial distances defined between an inboard boundary at 25% of a radial distance of the airfoil 25 and an outboard boundary at 75% of the radial distance of airfoil 25, and the outboard part-span shroud 52 may be positioned outside of an inboard boundary at 60% of the radial distances of airfoil 25. In an alternative embodiment, inboard part-span shroud 53 may be positioned within a range of radial distances defined between an inboard boundary at 40% of a radial distance of the airfoil 25 and an outboard boundary at 60% of the radial distance of the airfoil 25, and the outboard part-span shroud 52 may be positioned within a range of radial distances defined between an inboard boundary at 75% of the radial distance of the airfoil 25 and an outboard boundary that 95% of the radial distance of the airfoil 25. In another preferred embodiment, the inboard part-span shroud 53 may be positioned within a range of radial distances defined between an inboard boundary at 40% of a radial distance of the airfoil 25, and an outboard boundary at 60% of the radial distance of the airfoil 25, and the outboard part-span shroud 52 may be positioned outside of an inboard boundary at 90% of the radial distance of the airfoil 25.

As noted herein, aspects of the disclosure are directed toward turbine blades with a part-span shroud, where the part-span shroud includes a nominal profile substantially in accordance with at least a portion of Cartesian coordinate values of X, Y and Z set forth in TABLE I and TABLE II for upper and lower part-span shrouds, respectively. The Cartesian coordinate values are non-dimensional values of from 0% to 100% convertible to distances by multiplying the values by a distance of the airfoil expressed in units of distance. The X and Y values are connected by smooth continuing arcs that define airfoil profile sections at each distance Z along at least a portion of the part-span shroud, and the profile sections at the Z distances are joined smoothly with one another to form the nominal part-span shroud profile.

Figure 7:
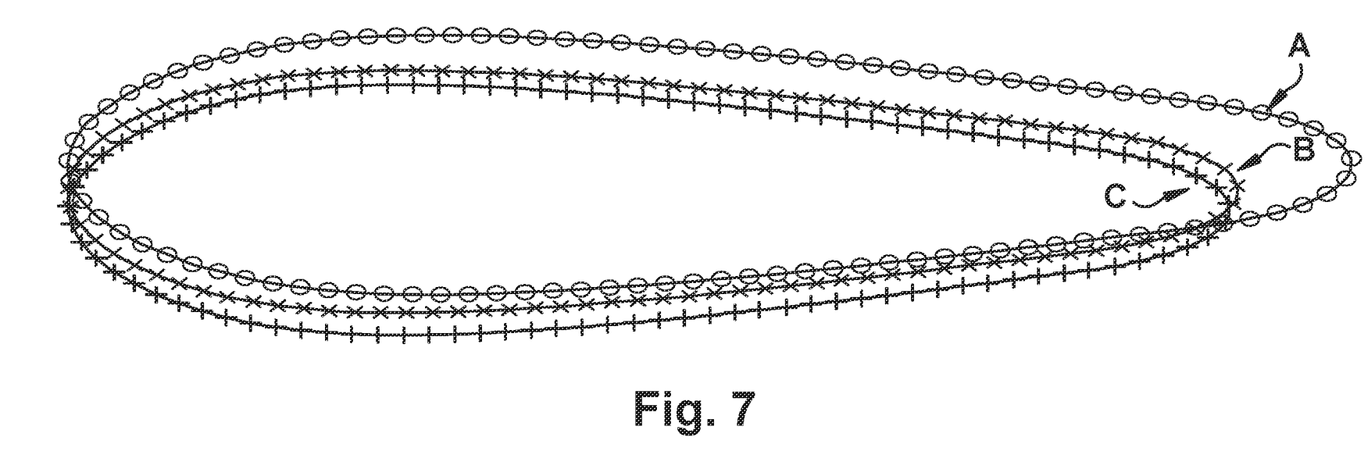
FIG. 7 is a representation of part-span shroud cross sections taken at A, B, C of FIG. 6, according to aspects of the present disclosure.
Figure 8:
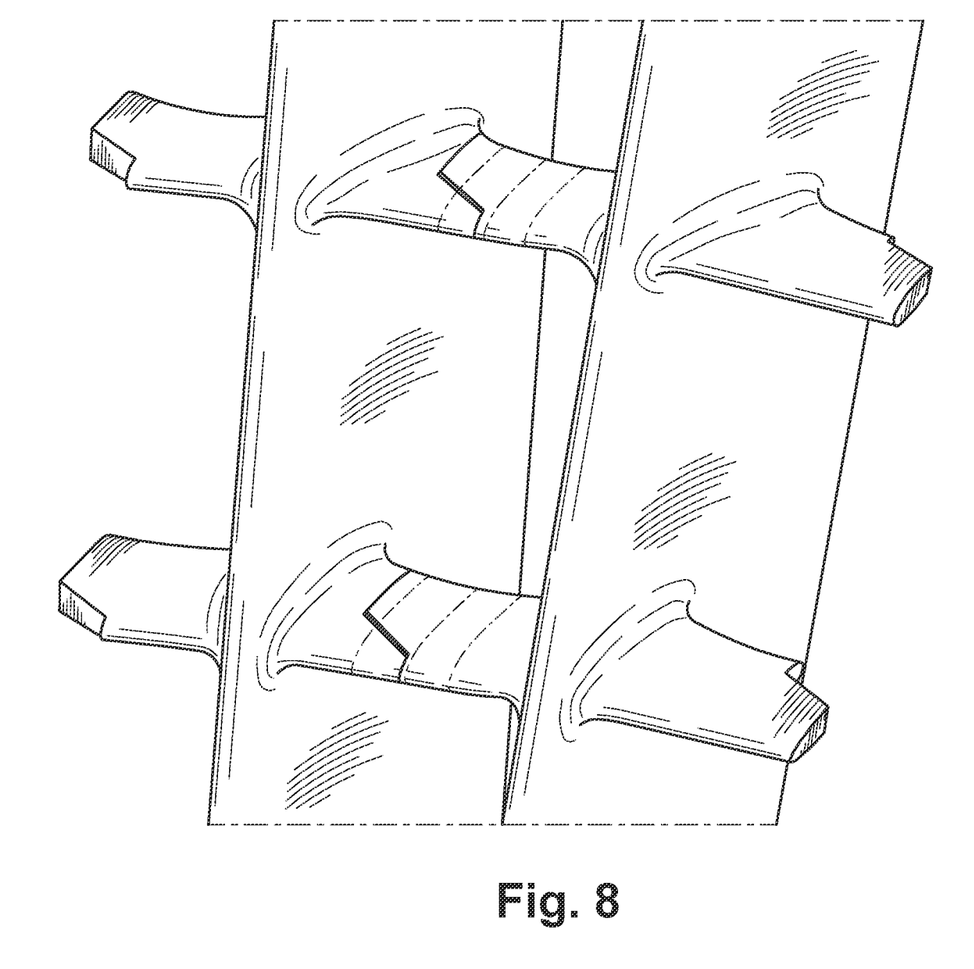
FIG. 8 is a side-view schematic representation of illustrative rotor blades having dual part-span shrouds engaged to adjacent part-span shrouds at interfaces, according to an embodiment of the present disclosure.

FIG. 7 illustrates part-span shroud cross sections taken along lines A, B, C of FIG. 5. The part-span shroud cross-sections decrease in area as each part-span shroud 52, 53 extends away from the blade 16 and airfoil 25. FIG. 8 is a side-view schematic representation of illustrative rotor blades having dual part-span shrouds engaged to adjacent part-span shrouds at interfaces.

The X, Y, and Z coordinates are positioned on each part-span shroud 52, 53 so the Z direction (FIG. 6) is aligned in a longitudinal orientation of part-span shroud 52, 53. Thus, the Z direction extends from airfoil 25 to interface 54 of each part-span shroud 52, 53.

The X, Y, and Z coordinate values in TABLE I and TABLE II have been expressed in normalized or non-dimensionalized form in values of from 0 to 1 (percentages), but it should be apparent that any or all of the coordinate values could instead be expressed in distance units so long as the percentages and proportions are maintained. To convert an X, Y or Z value of TABLE I or TABLE II to a respective X, Y or Z coordinate value in units of distance, such as inches or meters, the non-dimensional X, Y or Z value given in TABLE I or TABLE II can be multiplied by a length of the part-span shroud in such units of distance. By connecting the X and Y values with smooth continuing arcs, each profile cross section at each distance Z can be fixed, and the part-span shroud profiles of the various surface locations between the distances Z can be determined by smoothly connecting adjacent profile sections to one another, thus forming the nominal part-span shroud profile.

The values in TABLE I and TABLE II are non-dimensionalized percentages generated and shown up to four decimal places for determining the nominal profile of a part-span shroud at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I or TABLE II, particularly to the X and Y values therein. For example, a tolerance of about 10-20 percent of a thickness of an edge in a direction normal to any surface location along the part-span shroud profile can define a part-span shroud profile envelope for a design at cold or room temperature. In other words, a distance of about 10-20 percent of a thickness of the edge in a direction normal to any surface location along the part-span shroud profile can define a range of variation between measured points on an actual part-span shroud surface and ideal positions of those points, particularly at a cold or room temperature, as embodied by the disclosure. The part-span shroud configuration, as embodied herein, is robust to this range of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized percentage values by a common scaling factor, which may be a larger or smaller number of distance units than might have originally been used for a part-span shroud of a given dimension. For example, the non-dimensionalized percentage values in TABLE I or TABLE II, particularly the X and Y values, could be multiplied uniformly by a scaling factor of 2, 0.5, or any other desired scaling factor. In various embodiments, the X, Y, and Z distances are scalable as a function of the same constant or number to provide a scaled up or scaled down part-span shroud. Alternatively, the values could be multiplied by a larger or smaller desired distance.

While the Cartesian values in TABLE I and TABLE II provide Z coordinate values at increments between 0% and 100%, only a portion of Cartesian coordinate values set forth in TABLE I and TABLE II may be employed. In one non-limiting example, the part-span shroud profile sections may use a portion of Z coordinate values defined within 10% and 90% of the length of the part-span shroud. In another example, the part-span shroud profile sections may use a portion of the Cartesian coordinate values defined within 5% and 95% of the length of the part-span shroud. Any portion of Cartesian coordinate values of X, Y and Z set forth in TABLE I or TABLE II may be employed, e.g., from 20% to 30%, 37%-50%, etc.

In this aspect of the embodiments, each upper and lower part-span shroud is formed in accordance with a set of coordinates. The upper part-span shroud is formed in accordance with the following set of coordinates:

TABLE I

TURBINE ENGINE FRAME SIZE 7HA.03, UPPER PART-SPAN SHROUD,

| | Non-Dimensionalized * Multiplier | | | Multiplier |
|---|---|---|---|---|
| N | X | Y | Z | 100 |
| 1 | 0.000 | 0.000 | 0.000 | |
| 2 | 0.750 | 3.133 | 0.000 | |
| 3 | 2.383 | 5.917 | 0.000 | |
| 4 | 4.558 | 8.308 | 0.000 | |
| 5 | 7.058 | 10.367 | 0.000 | |
| 6 | 9.750 | 12.158 | 0.000 | |
| 7 | 12.600 | 13.700 | 0.000 | |
| 8 | 15.550 | 15.017 | 0.000 | |
| 9 | 18.592 | 16.125 | 0.000 | |
| 10 | 21.708 | 17.025 | 0.000 | |
| 11 | 24.858 | 17.742 | 0.000 | |
| 12 | 28.050 | 18.292 | 0.000 | |
| 13 | 31.267 | 18.700 | 0.000 | |
| 14 | 34.492 | 18.983 | 0.000 | |
| 15 | 37.717 | 19.158 | 0.000 | |
| 16 | 40.958 | 19.233 | 0.000 | |
| 17 | 44.192 | 19.225 | 0.000 | |
| 18 | 47.433 | 19.150 | 0.000 | |
| 19 | 50.667 | 19.017 | 0.000 | |
| 20 | 53.900 | 18.833 | 0.000 | |
| 21 | 57.125 | 18.617 | 0.000 | |
| 22 | 60.358 | 18.367 | 0.000 | |
| 23 | 63.583 | 18.092 | 0.000 | |
| 24 | 66.808 | 17.783 | 0.000 | |
| 25 | 70.025 | 17.450 | 0.000 | |
| 26 | 73.242 | 17.100 | 0.000 | |
| 27 | 76.458 | 16.733 | 0.000 | |
| 28 | 79.675 | 16.342 | 0.000 | |
| 29 | 82.883 | 15.933 | 0.000 | |
| 30 | 86.100 | 15.517 | 0.000 | |
| 31 | 89.308 | 15.083 | 0.000 | |
| 32 | 92.517 | 14.642 | 0.000 | |
| 33 | 95.717 | 14.192 | 0.000 | |
| 34 | 98.925 | 13.733 | 0.000 | |
| 35 | 102.125 | 13.267 | 0.000 | |
| 36 | 105.333 | 12.792 | 0.000 | |
| 37 | 108.533 | 12.317 | 0.000 | |
| 38 | 111.733 | 11.825 | 0.000 | |
| 39 | 114.933 | 11.333 | 0.000 | |
| 40 | 118.133 | 10.842 | 0.000 | |
| 41 | 121.333 | 10.342 | 0.000 | |
| 42 | 124.533 | 9.833 | 0.000 | |
| 43 | 127.733 | 9.342 | 0.000 | |
| 44 | 130.925 | 8.808 | 0.000 | |
| 45 | 134.092 | 8.158 | 0.000 | |
| 46 | 137.233 | 7.358 | 0.000 | |
| 47 | 140.292 | 6.317 | 0.000 | |
| 48 | 143.217 | 4.925 | 0.000 | |
| 49 | 145.800 | 2.992 | 0.000 | |
| 50 | 147.558 | 0.317 | 0.000 | |
| 51 | 146.967 | -2.775 | 0.000 | |
| 52 | 144.767 | -5.125 | 0.000 | |
| 53 | 142.000 | -6.792 | 0.000 | |
| 54 | 138.992 | -7.983 | 0.000 | |
| 55 | 135.900 | -8.942 | 0.000 | |
| 56 | 132.758 | -9.717 | 0.000 | |
| 57 | 129.575 | -10.308 | 0.000 | |
| 58 | 129.575 | -10.308 | 0.000 | |
| 59 | 126.375 | -10.825 | 0.000 | |
| 60 | 123.183 | -11.333 | 0.000 | |
| 61 | 119.983 | -11.833 | 0.000 | |
| 62 | 116.783 | -12.333 | 0.000 | |
| 63 | 113.583 | -12.833 | 0.000 | |
| 64 | 110.383 | -13.317 | 0.000 | |
| 65 | 107.183 | -13.800 | 0.000 | |
| 66 | 103.983 | -14.283 | 0.000 | |
| 67 | 100.775 | -14.750 | 0.000 | |
| 68 | 97.575 | -15.208 | 0.000 | |
| 69 | 94.367 | -15.667 | 0.000 | |
| 70 | 91.158 | -16.108 | 0.000 | |
| 71 | 87.950 | -16.542 | 0.000 | |
| 72 | 84.742 | -16.967 | 0.000 | |
| 73 | 81.533 | -17.383 | 0.000 | |
| 74 | 78.317 | -17.792 | 0.000 | |
| 75 | 75.108 | -18.175 | 0.000 | |
| 76 | 71.892 | -18.550 | 0.000 | |
| 77 | 68.667 | -18.892 | 0.000 | |
| 78 | 65.450 | -19.217 | 0.000 | |
| 79 | 62.225 | -19.517 | 0.000 | |
| 80 | 59.000 | -19.783 | 0.000 | |
| 81 | 55.767 | -20.017 | 0.000 | |
| 82 | 52.542 | -20.217 | 0.000 | |
| 83 | 49.300 | -20.375 | 0.000 | |
| 84 | 46.067 | -20.492 | 0.000 | |
| 85 | 42.833 | -20.550 | 0.000 | |
| 86 | 39.592 | -20.533 | 0.000 | |
| 87 | 36.358 | -20.433 | 0.000 | |
| 88 | 33.125 | -20.225 | 0.000 | |
| 89 | 29.908 | -19.900 | 0.000 | |
| 90 | 26.700 | -19.442 | 0.000 | |
| 91 | 23.525 | -18.825 | 0.000 | |
| 92 | 20.383 | -18.025 | 0.000 | |
| 93 | 17.300 | -17.042 | 0.000 | |
| 94 | 14.292 | -15.850 | 0.000 | |
| 95 | 11.375 | -14.450 | 0.000 | |
| 96 | 8.567 | -12.833 | 0.000 | |
| 97 | 5.942 | -10.950 | 0.000 | |
| 98 | 3.567 | -8.750 | 0.000 | |
| 99 | 1.617 | -6.175 | 0.000 | |
| 100 | 0.350 | -3.208 | 0.000 | |
| 1 | -0.025 | -4.208 | 50.000 | |
| 2 | 0.633 | -1.333 | 50.000 | |
| 3 | 2.067 | 1.250 | 50.000 | |
| 4 | 4.008 | 3.483 | 50.000 | |
| 5 | 6.250 | 5.417 | 50.000 | |
| 6 | 8.683 | 7.100 | 50.000 | |
| 7 | 11.258 | 8.558 | 50.000 | |
| 8 | 13.942 | 9.800 | 50.000 | |
| 9 | 16.717 | 10.850 | 50.000 | |
| 10 | 19.550 | 11.708 | 50.000 | |
| 11 | 22.433 | 12.392 | 50.000 | |
| 12 | 25.342 | 12.917 | 50.000 | |
| 13 | 28.275 | 13.308 | 50.000 | |
| 14 | 31.225 | 13.575 | 50.000 | |
| 15 | 34.183 | 13.750 | 50.000 | |
| 16 | 37.142 | 13.825 | 50.000 | |
| 17 | 40.100 | 13.825 | 50.000 | |
| 18 | 43.067 | 13.750 | 50.000 | |
| 19 | 46.025 | 13.625 | 50.000 | |
| 20 | 48.975 | 13.458 | 50.000 | |
| 21 | 51.933 | 13.258 | 50.000 | |
| 22 | 54.883 | 13.025 | 50.000 | |
| 23 | 57.833 | 12.767 | 50.000 | |
| 24 | 60.783 | 12.475 | 50.000 | |
| 25 | 63.725 | 12.167 | 50.000 | |
| 26 | 66.667 | 11.842 | 50.000 | |
| 27 | 69.608 | 11.492 | 50.000 | |
| 28 | 72.550 | 11.125 | 50.000 | |
| 29 | 75.483 | 10.750 | 50.000 | |
| 30 | 78.417 | 10.350 | 50.000 | |
| 31 | 81.350 | 9.950 | 50.000 | |
| 32 | 84.283 | 9.533 | 50.000 | |
| 33 | 87.217 | 9.117 | 50.000 | |
| 34 | 90.150 | 8.683 | 50.000 | |
| 35 | 93.075 | 8.250 | 50.000 | |
| 36 | 96.000 | 7.800 | 50.000 | |

TABLE I-continued

TURBINE ENGINE FRAME SIZE 7HA.03, UPPER PART-SPAN SHROUD,

| | Non-Dimensionalized * Multiplier | | | Multiplier |
|---|---|---|---|---|
| N | X | Y | Z | 100 |
| 37 | 98.933 | 7.350 | 50.000 | |
| 38 | 101.858 | 6.900 | 50.000 | |
| 39 | 104.783 | 6.442 | 50.000 | |
| 40 | 107.708 | 5.975 | 50.000 | |
| 41 | 110.633 | 5.500 | 50.000 | |
| 42 | 113.550 | 5.033 | 50.000 | |
| 43 | 116.475 | 4.575 | 50.000 | |
| 44 | 119.400 | 4.067 | 50.000 | |
| 45 | 122.292 | 3.458 | 50.000 | |
| 46 | 125.158 | 2.708 | 50.000 | |
| 47 | 127.950 | 1.725 | 50.000 | |
| 48 | 130.600 | 0.417 | 50.000 | |
| 49 | 132.933 | −1.392 | 50.000 | |
| 50 | 134.517 | −3.858 | 50.000 | |
| 51 | 134.017 | −6.700 | 50.000 | |
| 52 | 132.058 | −8.900 | 50.000 | |
| 53 | 129.550 | −10.467 | 50.000 | |
| 54 | 126.817 | −11.600 | 50.000 | |
| 55 | 124.000 | −12.500 | 50.000 | |
| 56 | 121.125 | −13.225 | 50.000 | |
| 57 | 118.217 | −13.792 | 50.000 | |
| 58 | 118.217 | −13.792 | 50.000 | |
| 59 | 115.300 | −14.267 | 50.000 | |
| 60 | 112.375 | −14.750 | 50.000 | |
| 61 | 109.450 | −15.225 | 50.000 | |
| 62 | 106.525 | −15.692 | 50.000 | |
| 63 | 103.600 | −16.158 | 50.000 | |
| 64 | 100.675 | −16.617 | 50.000 | |
| 65 | 97.750 | −17.067 | 50.000 | |
| 66 | 94.825 | −17.517 | 50.000 | |
| 67 | 91.900 | −17.958 | 50.000 | |
| 68 | 88.967 | −18.392 | 50.000 | |
| 69 | 86.033 | −18.817 | 50.000 | |
| 70 | 83.108 | −19.233 | 50.000 | |
| 71 | 80.175 | −19.642 | 50.000 | |
| 72 | 77.242 | −20.042 | 50.000 | |
| 73 | 74.300 | −20.433 | 50.000 | |
| 74 | 71.367 | −20.808 | 50.000 | |
| 75 | 68.425 | −21.175 | 50.000 | |
| 76 | 65.483 | −21.517 | 50.000 | |
| 77 | 62.542 | −21.842 | 50.000 | |
| 78 | 59.600 | −22.150 | 50.000 | |
| 79 | 56.650 | −22.425 | 50.000 | |
| 80 | 53.700 | −22.675 | 50.000 | |
| 81 | 50.750 | −22.892 | 50.000 | |
| 82 | 47.792 | −23.075 | 50.000 | |
| 83 | 44.833 | −23.225 | 50.000 | |
| 84 | 41.875 | −23.333 | 50.000 | |
| 85 | 38.917 | −23.383 | 50.000 | |
| 86 | 35.950 | −23.367 | 50.000 | |
| 87 | 32.992 | −23.258 | 50.000 | |
| 88 | 30.042 | −23.058 | 50.000 | |
| 89 | 27.092 | −22.758 | 50.000 | |
| 90 | 24.167 | −22.317 | 50.000 | |
| 91 | 21.267 | −21.725 | 50.000 | |
| 92 | 18.400 | −20.967 | 50.000 | |
| 93 | 15.592 | −20.033 | 50.000 | |
| 94 | 12.858 | −18.908 | 50.000 | |
| 95 | 10.200 | −17.592 | 50.000 | |
| 96 | 7.667 | −16.075 | 50.000 | |
| 97 | 5.283 | −14.317 | 50.000 | |
| 98 | 3.150 | −12.258 | 50.000 | |
| 99 | 1.408 | −9.875 | 50.000 | |
| 100 | 0.292 | −7.142 | 50.000 | |
| 1 | 0.092 | −6.917 | 100.000 | |
| 2 | 0.708 | −4.042 | 100.000 | |
| 3 | 2.092 | −1.450 | 100.000 | |
| 4 | 3.975 | 0.817 | 100.000 | |
| 5 | 6.150 | 2.800 | 100.000 | |
| 6 | 8.533 | 4.542 | 100.000 | |
| 7 | 11.067 | 6.050 | 100.000 | |
| 8 | 13.708 | 7.350 | 100.000 | |
| 9 | 16.442 | 8.458 | 100.000 | |
| 10 | 19.250 | 9.367 | 100.000 | |
| 11 | 22.100 | 10.092 | 100.000 | |
| 12 | 25.000 | 10.667 | 100.000 | |
| 13 | 27.917 | 11.083 | 100.000 | |
| 14 | 30.850 | 11.375 | 100.000 | |
| 15 | 33.792 | 11.558 | 100.000 | |
| 16 | 36.742 | 11.650 | 100.000 | |
| 17 | 39.683 | 11.650 | 100.000 | |
| 18 | 42.633 | 11.592 | 100.000 | |
| 19 | 45.583 | 11.467 | 100.000 | |
| 20 | 48.525 | 11.292 | 100.000 | |
| 21 | 51.467 | 11.083 | 100.000 | |
| 22 | 54.408 | 10.842 | 100.000 | |
| 23 | 57.342 | 10.575 | 100.000 | |
| 24 | 60.275 | 10.283 | 100.000 | |
| 25 | 63.208 | 9.967 | 100.000 | |
| 26 | 66.133 | 9.625 | 100.000 | |
| 27 | 69.058 | 9.258 | 100.000 | |
| 28 | 71.983 | 8.883 | 100.000 | |
| 29 | 74.908 | 8.483 | 100.000 | |
| 30 | 77.825 | 8.075 | 100.000 | |
| 31 | 80.750 | 7.658 | 100.000 | |
| 32 | 83.667 | 7.233 | 100.000 | |
| 33 | 86.583 | 6.800 | 100.000 | |
| 34 | 89.500 | 6.350 | 100.000 | |
| 35 | 92.408 | 5.900 | 100.000 | |
| 36 | 95.325 | 5.442 | 100.000 | |
| 37 | 98.233 | 4.975 | 100.000 | |
| 38 | 101.142 | 4.500 | 100.000 | |
| 39 | 104.058 | 4.033 | 100.000 | |
| 40 | 106.967 | 3.575 | 100.000 | |
| 41 | 109.883 | 3.125 | 100.000 | |
| 42 | 112.792 | 2.650 | 100.000 | |
| 43 | 115.700 | 2.142 | 100.000 | |
| 44 | 118.592 | 1.567 | 100.000 | |
| 45 | 121.467 | 0.917 | 100.000 | |
| 46 | 124.300 | 0.117 | 100.000 | |
| 47 | 127.058 | −0.925 | 100.000 | |
| 48 | 129.675 | −2.283 | 100.000 | |
| 49 | 131.942 | −4.150 | 100.000 | |
| 50 | 133.417 | −6.667 | 100.000 | |
| 51 | 133.050 | −9.517 | 100.000 | |
| 52 | 131.142 | −11.742 | 100.000 | |
| 53 | 128.675 | −13.342 | 100.000 | |
| 54 | 125.975 | −14.517 | 100.000 | |
| 55 | 123.183 | −15.458 | 100.000 | |
| 56 | 120.333 | −16.217 | 100.000 | |
| 57 | 117.442 | −16.800 | 100.000 | |
| 58 | 117.442 | −16.800 | 100.000 | |
| 59 | 114.533 | −17.300 | 100.000 | |
| 60 | 111.625 | −17.800 | 100.000 | |
| 61 | 108.717 | −18.292 | 100.000 | |
| 62 | 105.817 | −18.783 | 100.000 | |
| 63 | 102.908 | −19.267 | 100.000 | |
| 64 | 99.992 | −19.750 | 100.000 | |
| 65 | 97.083 | −20.225 | 100.000 | |
| 66 | 94.175 | −20.692 | 100.000 | |
| 67 | 91.258 | −21.150 | 100.000 | |
| 68 | 88.350 | −21.600 | 100.000 | |
| 69 | 85.433 | −22.042 | 100.000 | |
| 70 | 82.517 | −22.483 | 100.000 | |
| 71 | 79.600 | −22.908 | 100.000 | |
| 72 | 76.683 | −23.325 | 100.000 | |
| 73 | 73.758 | −23.733 | 100.000 | |
| 74 | 70.833 | −24.125 | 100.000 | |
| 75 | 67.917 | −24.508 | 100.000 | |
| 76 | 64.983 | −24.867 | 100.000 | |
| 77 | 62.058 | −25.208 | 100.000 | |
| 78 | 59.125 | −25.517 | 100.000 | |
| 79 | 56.192 | −25.808 | 100.000 | |
| 80 | 53.250 | −26.067 | 100.000 | |
| 81 | 50.317 | −26.283 | 100.000 | |
| 82 | 47.367 | −26.475 | 100.000 | |

TABLE I-continued

TURBINE ENGINE FRAME SIZE 7HA.03, UPPER PART-SPAN SHROUD,

| | Non-Dimensionalized * Multiplier | | | Multiplier |
|---|---|---|---|---|
| N | X | Y | Z | 100 |
| 83 | 44.425 | −26.625 | 100.000 | |
| 84 | 41.475 | −26.725 | 100.000 | |
| 85 | 38.533 | −26.767 | 100.000 | |
| 86 | 35.583 | −26.733 | 100.000 | |
| 87 | 32.633 | −26.608 | 100.000 | |
| 88 | 29.700 | −26.383 | 100.000 | |
| 89 | 26.767 | −26.042 | 100.000 | |
| 90 | 23.858 | −25.550 | 100.000 | |
| 91 | 20.983 | −24.900 | 100.000 | |
| 92 | 18.150 | −24.083 | 100.000 | |
| 93 | 15.383 | −23.083 | 100.000 | |
| 94 | 12.683 | −21.892 | 100.000 | |
| 95 | 10.083 | −20.492 | 100.000 | |
| 96 | 7.608 | −18.900 | 100.000 | |
| 97 | 5.300 | −17.067 | 100.000 | |
| 98 | 3.233 | −14.967 | 100.000 | |
| 99 | 1.550 | −12.550 | 100.000 | |
| 100 | 0.433 | −9.833 | 100.000 | |

TABLE II

TURBINE ENGINE FRAME SIZE 7HA.03, LOWER PART-SPAN SHROUD

| | Non-Dimensionalized * Multiplier | | | Multiplier |
|---|---|---|---|---|
| N | X | Y | Z | 100 |
| 1 | 0.000 | 0.000 | 0.000 | |
| 2 | 0.316 | 2.368 | 0.000 | |
| 3 | 1.406 | 4.503 | 0.000 | |
| 4 | 2.974 | 6.316 | 0.000 | |
| 5 | 4.852 | 7.819 | 0.000 | |
| 6 | 6.910 | 9.058 | 0.000 | |
| 7 | 9.071 | 10.110 | 0.000 | |
| 8 | 11.297 | 11.019 | 0.000 | |
| 9 | 13.568 | 11.800 | 0.000 | |
| 10 | 15.884 | 12.452 | 0.000 | |
| 11 | 18.226 | 12.987 | 0.000 | |
| 12 | 20.594 | 13.419 | 0.000 | |
| 13 | 22.974 | 13.761 | 0.000 | |
| 14 | 25.361 | 14.032 | 0.000 | |
| 15 | 27.755 | 14.239 | 0.000 | |
| 16 | 30.155 | 14.387 | 0.000 | |
| 17 | 32.561 | 14.484 | 0.000 | |
| 18 | 34.961 | 14.542 | 0.000 | |
| 19 | 37.368 | 14.555 | 0.000 | |
| 20 | 39.768 | 14.535 | 0.000 | |
| 21 | 42.174 | 14.484 | 0.000 | |
| 22 | 44.581 | 14.413 | 0.000 | |
| 23 | 46.981 | 14.316 | 0.000 | |
| 24 | 49.381 | 14.206 | 0.000 | |
| 25 | 51.781 | 14.077 | 0.000 | |
| 26 | 54.181 | 13.935 | 0.000 | |
| 27 | 56.581 | 13.787 | 0.000 | |
| 28 | 58.981 | 13.619 | 0.000 | |
| 29 | 61.381 | 13.445 | 0.000 | |
| 30 | 63.774 | 13.258 | 0.000 | |
| 31 | 66.174 | 13.058 | 0.000 | |
| 32 | 68.568 | 12.852 | 0.000 | |
| 33 | 70.961 | 12.639 | 0.000 | |
| 34 | 73.355 | 12.419 | 0.000 | |
| 35 | 75.748 | 12.194 | 0.000 | |
| 36 | 78.142 | 11.961 | 0.000 | |
| 37 | 80.535 | 11.729 | 0.000 | |
| 38 | 82.929 | 11.490 | 0.000 | |
| 39 | 85.323 | 11.245 | 0.000 | |
| 40 | 87.716 | 10.994 | 0.000 | |
| 41 | 90.103 | 10.742 | 0.000 | |
| 42 | 92.497 | 10.490 | 0.000 | |

TABLE II-continued

TURBINE ENGINE FRAME SIZE 7HA.03, LOWER PART-SPAN SHROUD

| | Non-Dimensionalized * Multiplier | | | Multiplier |
|---|---|---|---|---|
| N | X | Y | Z | 100 |
| 43 | 94.884 | 10.232 | 0.000 | |
| 44 | 97.277 | 9.968 | 0.000 | |
| 45 | 99.665 | 9.703 | 0.000 | |
| 46 | 102.058 | 9.432 | 0.000 | |
| 47 | 104.445 | 9.168 | 0.000 | |
| 48 | 106.832 | 8.897 | 0.000 | |
| 49 | 109.226 | 8.626 | 0.000 | |
| 50 | 111.613 | 8.348 | 0.000 | |
| 51 | 114.000 | 8.077 | 0.000 | |
| 52 | 116.387 | 7.806 | 0.000 | |
| 53 | 118.781 | 7.529 | 0.000 | |
| 54 | 121.168 | 7.258 | 0.000 | |
| 55 | 123.555 | 6.987 | 0.000 | |
| 56 | 125.942 | 6.710 | 0.000 | |
| 57 | 128.329 | 6.413 | 0.000 | |
| 58 | 130.710 | 6.084 | 0.000 | |
| 59 | 133.077 | 5.665 | 0.000 | |
| 60 | 135.406 | 5.058 | 0.000 | |
| 61 | 137.639 | 4.168 | 0.000 | |
| 62 | 139.645 | 2.858 | 0.000 | |
| 63 | 140.968 | 0.897 | 0.000 | |
| 64 | 140.239 | −1.303 | 0.000 | |
| 65 | 138.394 | −2.826 | 0.000 | |
| 66 | 136.226 | −3.858 | 0.000 | |
| 67 | 133.929 | −4.574 | 0.000 | |
| 68 | 131.581 | −5.065 | 0.000 | |
| 69 | 129.200 | −5.400 | 0.000 | |
| 70 | 129.200 | −5.400 | 0.000 | |
| 71 | 126.813 | −5.684 | 0.000 | |
| 72 | 124.419 | −5.961 | 0.000 | |
| 73 | 122.032 | −6.245 | 0.000 | |
| 74 | 119.645 | −6.523 | 0.000 | |
| 75 | 117.258 | −6.806 | 0.000 | |
| 76 | 114.871 | −7.077 | 0.000 | |
| 77 | 112.484 | −7.355 | 0.000 | |
| 78 | 110.090 | −7.626 | 0.000 | |
| 79 | 107.703 | −7.897 | 0.000 | |
| 80 | 105.316 | −8.168 | 0.000 | |
| 81 | 102.923 | −8.439 | 0.000 | |
| 82 | 100.535 | −8.703 | 0.000 | |
| 83 | 98.142 | −8.968 | 0.000 | |
| 84 | 95.755 | −9.226 | 0.000 | |
| 85 | 93.361 | −9.484 | 0.000 | |
| 86 | 90.974 | −9.742 | 0.000 | |
| 87 | 88.581 | −9.994 | 0.000 | |
| 88 | 86.194 | −10.245 | 0.000 | |
| 89 | 83.800 | −10.490 | 0.000 | |
| 90 | 81.406 | −10.735 | 0.000 | |
| 91 | 79.013 | −10.974 | 0.000 | |
| 92 | 76.619 | −11.206 | 0.000 | |
| 93 | 74.226 | −11.432 | 0.000 | |
| 94 | 71.832 | −11.652 | 0.000 | |
| 95 | 69.439 | −11.865 | 0.000 | |
| 96 | 67.045 | −12.071 | 0.000 | |
| 97 | 64.645 | −12.271 | 0.000 | |
| 98 | 62.252 | −12.458 | 0.000 | |
| 99 | 59.852 | −12.639 | 0.000 | |
| 100 | 57.452 | −12.806 | 0.000 | |
| 101 | 55.052 | −12.968 | 0.000 | |
| 102 | 52.652 | −13.110 | 0.000 | |
| 103 | 50.252 | −13.245 | 0.000 | |
| 104 | 47.852 | −13.368 | 0.000 | |
| 105 | 45.452 | −13.465 | 0.000 | |
| 106 | 43.045 | −13.542 | 0.000 | |
| 107 | 40.645 | −13.600 | 0.000 | |
| 108 | 38.239 | −13.632 | 0.000 | |
| 109 | 35.832 | −13.632 | 0.000 | |
| 110 | 33.432 | −13.606 | 0.000 | |
| 111 | 31.026 | −13.535 | 0.000 | |
| 112 | 28.626 | −13.413 | 0.000 | |
| 113 | 26.226 | −13.239 | 0.000 | |
| 114 | 23.839 | −12.994 | 0.000 | |
| 115 | 21.452 | −12.671 | 0.000 | |

TABLE II-continued

TURBINE ENGINE FRAME SIZE 7HA.03, LOWER PART-SPAN SHROUD

| | Non-Dimensionalized * Multiplier | | | Multiplier |
|---|---|---|---|---|
| N | X | Y | Z | 100 |
| 116 | 19.084 | −12.265 | 0.000 | |
| 117 | 16.735 | −11.761 | 0.000 | |
| 118 | 14.406 | −11.161 | 0.000 | |
| 119 | 12.110 | −10.439 | 0.000 | |
| 120 | 9.865 | −9.581 | 0.000 | |
| 121 | 7.677 | −8.581 | 0.000 | |
| 122 | 5.574 | −7.426 | 0.000 | |
| 123 | 3.619 | −6.026 | 0.000 | |
| 124 | 1.923 | −4.329 | 0.000 | |
| 125 | 0.632 | −2.310 | 0.000 | |
| 1 | 0.071 | −3.381 | 50.323 | |
| 2 | 0.329 | −1.200 | 50.323 | |
| 3 | 1.284 | 0.787 | 50.323 | |
| 4 | 2.677 | 2.497 | 50.323 | |
| 5 | 4.361 | 3.929 | 50.323 | |
| 6 | 6.226 | 5.116 | 50.323 | |
| 7 | 8.194 | 6.129 | 50.323 | |
| 8 | 10.219 | 7.006 | 50.323 | |
| 9 | 12.297 | 7.755 | 50.323 | |
| 10 | 14.419 | 8.381 | 50.323 | |
| 11 | 16.568 | 8.903 | 50.323 | |
| 12 | 18.735 | 9.323 | 50.323 | |
| 13 | 20.923 | 9.658 | 50.323 | |
| 14 | 23.116 | 9.923 | 50.323 | |
| 15 | 25.316 | 10.123 | 50.323 | |
| 16 | 27.523 | 10.271 | 50.323 | |
| 17 | 29.735 | 10.368 | 50.323 | |
| 18 | 31.942 | 10.426 | 50.323 | |
| 19 | 34.155 | 10.439 | 50.323 | |
| 20 | 36.368 | 10.419 | 50.323 | |
| 21 | 38.574 | 10.374 | 50.323 | |
| 22 | 40.787 | 10.303 | 50.323 | |
| 23 | 42.994 | 10.213 | 50.323 | |
| 24 | 45.200 | 10.110 | 50.323 | |
| 25 | 47.413 | 9.994 | 50.323 | |
| 26 | 49.619 | 9.858 | 50.323 | |
| 27 | 51.826 | 9.710 | 50.323 | |
| 28 | 54.026 | 9.555 | 50.323 | |
| 29 | 56.232 | 9.387 | 50.323 | |
| 30 | 58.439 | 9.213 | 50.323 | |
| 31 | 60.639 | 9.026 | 50.323 | |
| 32 | 62.839 | 8.826 | 50.323 | |
| 33 | 65.045 | 8.626 | 50.323 | |
| 34 | 67.245 | 8.413 | 50.323 | |
| 35 | 69.445 | 8.200 | 50.323 | |
| 36 | 71.645 | 7.981 | 50.323 | |
| 37 | 73.845 | 7.755 | 50.323 | |
| 38 | 76.045 | 7.529 | 50.323 | |
| 39 | 78.239 | 7.297 | 50.323 | |
| 40 | 80.439 | 7.058 | 50.323 | |
| 41 | 82.639 | 6.819 | 50.323 | |
| 42 | 84.832 | 6.581 | 50.323 | |
| 43 | 87.032 | 6.335 | 50.323 | |
| 44 | 89.226 | 6.084 | 50.323 | |
| 45 | 91.426 | 5.832 | 50.323 | |
| 46 | 93.619 | 5.581 | 50.323 | |
| 47 | 95.819 | 5.329 | 50.323 | |
| 48 | 98.013 | 5.071 | 50.323 | |
| 49 | 100.206 | 4.813 | 50.323 | |
| 50 | 102.406 | 4.548 | 50.323 | |
| 51 | 104.600 | 4.290 | 50.323 | |
| 52 | 106.794 | 4.026 | 50.323 | |
| 53 | 108.987 | 3.761 | 50.323 | |
| 54 | 111.187 | 3.503 | 50.323 | |
| 55 | 113.381 | 3.245 | 50.323 | |
| 56 | 115.574 | 2.981 | 50.323 | |
| 57 | 117.768 | 2.697 | 50.323 | |
| 58 | 119.955 | 2.387 | 50.323 | |
| 59 | 122.129 | 1.974 | 50.323 | |
| 60 | 124.258 | 1.387 | 50.323 | |
| 61 | 126.297 | 0.535 | 50.323 | |
| 62 | 128.110 | −0.716 | 50.323 | |
| 63 | 129.290 | −2.548 | 50.323 | |
| 64 | 128.652 | −4.587 | 50.323 | |
| 65 | 127.000 | −6.045 | 50.323 | |
| 66 | 125.026 | −7.026 | 50.323 | |
| 67 | 122.923 | −7.710 | 50.323 | |
| 68 | 120.761 | −8.181 | 50.323 | |
| 69 | 118.574 | −8.503 | 50.323 | |
| 70 | 118.574 | −8.503 | 50.323 | |
| 71 | 116.381 | −8.774 | 50.323 | |
| 72 | 114.187 | −9.045 | 50.323 | |
| 73 | 111.994 | −9.310 | 50.323 | |
| 74 | 109.800 | −9.581 | 50.323 | |
| 75 | 107.606 | −9.845 | 50.323 | |
| 76 | 105.413 | −10.110 | 50.323 | |
| 77 | 103.213 | −10.374 | 50.323 | |
| 78 | 101.019 | −10.632 | 50.323 | |
| 79 | 98.826 | −10.897 | 50.323 | |
| 80 | 96.626 | −11.155 | 50.323 | |
| 81 | 94.432 | −11.406 | 50.323 | |
| 82 | 92.239 | −11.665 | 50.323 | |
| 83 | 90.039 | −11.916 | 50.323 | |
| 84 | 87.845 | −12.161 | 50.323 | |
| 85 | 85.645 | −12.413 | 50.323 | |
| 86 | 83.452 | −12.658 | 50.323 | |
| 87 | 81.252 | −12.897 | 50.323 | |
| 88 | 79.052 | −13.142 | 50.323 | |
| 89 | 76.858 | −13.374 | 50.323 | |
| 90 | 74.658 | −13.606 | 50.323 | |
| 91 | 72.458 | −13.832 | 50.323 | |
| 92 | 70.258 | −14.058 | 50.323 | |
| 93 | 68.058 | −14.277 | 50.323 | |
| 94 | 65.858 | −14.484 | 50.323 | |
| 95 | 63.658 | −14.690 | 50.323 | |
| 96 | 61.452 | −14.884 | 50.323 | |
| 97 | 59.252 | −15.071 | 50.323 | |
| 98 | 57.045 | −15.252 | 50.323 | |
| 99 | 54.845 | −15.426 | 50.323 | |
| 100 | 52.639 | −15.587 | 50.323 | |
| 101 | 50.432 | −15.735 | 50.323 | |
| 102 | 48.226 | −15.877 | 50.323 | |
| 103 | 46.019 | −16.006 | 50.323 | |
| 104 | 43.813 | −16.116 | 50.323 | |
| 105 | 41.600 | −16.213 | 50.323 | |
| 106 | 39.394 | −16.284 | 50.323 | |
| 107 | 37.181 | −16.335 | 50.323 | |
| 108 | 34.974 | −16.368 | 50.323 | |
| 109 | 32.761 | −16.361 | 50.323 | |
| 110 | 30.548 | −16.335 | 50.323 | |
| 111 | 28.342 | −16.265 | 50.323 | |
| 112 | 26.135 | −16.142 | 50.323 | |
| 113 | 23.929 | −15.968 | 50.323 | |
| 114 | 21.735 | −15.723 | 50.323 | |
| 115 | 19.542 | −15.413 | 50.323 | |
| 116 | 17.368 | −15.013 | 50.323 | |
| 117 | 15.213 | −14.529 | 50.323 | |
| 118 | 13.084 | −13.942 | 50.323 | |
| 119 | 10.987 | −13.239 | 50.323 | |
| 120 | 8.935 | −12.413 | 50.323 | |
| 121 | 6.942 | −11.452 | 50.323 | |
| 122 | 5.039 | −10.335 | 50.323 | |
| 123 | 3.277 | −9.000 | 50.323 | |
| 124 | 1.761 | −7.394 | 50.323 | |
| 125 | 0.619 | −5.510 | 50.323 | |
| 1 | 0.065 | −5.800 | 100.000 | |
| 2 | 0.323 | −3.587 | 100.000 | |
| 3 | 1.258 | −1.555 | 100.000 | |
| 4 | 2.658 | 0.194 | 100.000 | |
| 5 | 4.342 | 1.671 | 100.000 | |
| 6 | 6.219 | 2.897 | 100.000 | |
| 7 | 8.200 | 3.948 | 100.000 | |
| 8 | 10.252 | 4.858 | 100.000 | |
| 9 | 12.355 | 5.632 | 100.000 | |
| 10 | 14.503 | 6.284 | 100.000 | |
| 11 | 16.677 | 6.826 | 100.000 | |

TABLE II-continued

TURBINE ENGINE FRAME SIZE 7HA.03, LOWER PART-SPAN SHROUD

| | Non-Dimensionalized * Multiplier | | | Multiplier |
|---|---|---|---|---|
| N | X | Y | Z | 100 |
| 12 | 18.877 | 7.265 | 100.000 | |
| 13 | 21.097 | 7.613 | 100.000 | |
| 14 | 23.323 | 7.884 | 100.000 | |
| 15 | 25.555 | 8.097 | 100.000 | |
| 16 | 27.794 | 8.252 | 100.000 | |
| 17 | 30.032 | 8.355 | 100.000 | |
| 18 | 32.277 | 8.413 | 100.000 | |
| 19 | 34.516 | 8.432 | 100.000 | |
| 20 | 36.761 | 8.413 | 100.000 | |
| 21 | 39.006 | 8.368 | 100.000 | |
| 22 | 41.245 | 8.297 | 100.000 | |
| 23 | 43.490 | 8.206 | 100.000 | |
| 24 | 45.729 | 8.097 | 100.000 | |
| 25 | 47.968 | 7.974 | 100.000 | |
| 26 | 50.206 | 7.839 | 100.000 | |
| 27 | 52.445 | 7.690 | 100.000 | |
| 28 | 54.684 | 7.529 | 100.000 | |
| 29 | 56.923 | 7.355 | 100.000 | |
| 30 | 59.155 | 7.174 | 100.000 | |
| 31 | 61.394 | 6.981 | 100.000 | |
| 32 | 63.626 | 6.781 | 100.000 | |
| 33 | 65.858 | 6.568 | 100.000 | |
| 34 | 68.090 | 6.355 | 100.000 | |
| 35 | 70.323 | 6.135 | 100.000 | |
| 36 | 72.555 | 5.903 | 100.000 | |
| 37 | 74.787 | 5.677 | 100.000 | |
| 38 | 77.019 | 5.439 | 100.000 | |
| 39 | 79.245 | 5.200 | 100.000 | |
| 40 | 81.477 | 4.961 | 100.000 | |
| 41 | 83.710 | 4.716 | 100.000 | |
| 42 | 85.935 | 4.465 | 100.000 | |
| 43 | 88.168 | 4.213 | 100.000 | |
| 44 | 90.394 | 3.961 | 100.000 | |
| 45 | 92.626 | 3.703 | 100.000 | |
| 46 | 94.852 | 3.445 | 100.000 | |
| 47 | 97.077 | 3.181 | 100.000 | |
| 48 | 99.310 | 2.916 | 100.000 | |
| 49 | 101.535 | 2.652 | 100.000 | |
| 50 | 103.761 | 2.381 | 100.000 | |
| 51 | 105.987 | 2.110 | 100.000 | |
| 52 | 108.213 | 1.839 | 100.000 | |
| 53 | 110.445 | 1.568 | 100.000 | |
| 54 | 112.671 | 1.297 | 100.000 | |
| 55 | 114.897 | 1.026 | 100.000 | |
| 56 | 117.123 | 0.755 | 100.000 | |
| 57 | 119.348 | 0.471 | 100.000 | |
| 58 | 121.568 | 0.148 | 100.000 | |
| 59 | 123.774 | −0.265 | 100.000 | |
| 60 | 125.929 | −0.877 | 100.000 | |
| 61 | 127.987 | −1.768 | 100.000 | |
| 62 | 129.813 | −3.058 | 100.000 | |
| 63 | 131.000 | −4.923 | 100.000 | |
| 64 | 130.387 | −7.006 | 100.000 | |
| 65 | 128.735 | −8.503 | 100.000 | |
| 66 | 126.735 | −9.516 | 100.000 | |
| 67 | 124.613 | −10.232 | 100.000 | |
| 68 | 122.419 | −10.716 | 100.000 | |
| 69 | 120.200 | −11.045 | 100.000 | |
| 70 | 120.200 | −11.045 | 100.000 | |
| 71 | 117.974 | −11.329 | 100.000 | |
| 72 | 115.748 | −11.606 | 100.000 | |
| 73 | 113.523 | −11.884 | 100.000 | |
| 74 | 111.297 | −12.161 | 100.000 | |
| 75 | 109.071 | −12.432 | 100.000 | |
| 76 | 106.845 | −12.710 | 100.000 | |
| 77 | 104.619 | −12.981 | 100.000 | |
| 78 | 102.394 | −13.245 | 100.000 | |
| 79 | 100.168 | −13.516 | 100.000 | |
| 80 | 97.935 | −13.781 | 100.000 | |
| 81 | 95.710 | −14.045 | 100.000 | |
| 82 | 93.484 | −14.310 | 100.000 | |
| 83 | 91.252 | −14.568 | 100.000 | |
| 84 | 89.026 | −14.826 | 100.000 | |
| 85 | 86.794 | −15.077 | 100.000 | |
| 86 | 84.568 | −15.329 | 100.000 | |
| 87 | 82.335 | −15.581 | 100.000 | |
| 88 | 80.110 | −15.826 | 100.000 | |
| 89 | 77.877 | −16.071 | 100.000 | |
| 90 | 75.652 | −16.310 | 100.000 | |
| 91 | 73.419 | −16.542 | 100.000 | |
| 92 | 71.187 | −16.774 | 100.000 | |
| 93 | 68.955 | −16.994 | 100.000 | |
| 94 | 66.723 | −17.213 | 100.000 | |
| 95 | 64.490 | −17.419 | 100.000 | |
| 96 | 62.252 | −17.626 | 100.000 | |
| 97 | 60.019 | −17.819 | 100.000 | |
| 98 | 57.781 | −18.000 | 100.000 | |
| 99 | 55.548 | −18.181 | 100.000 | |
| 100 | 53.310 | −18.342 | 100.000 | |
| 101 | 51.071 | −18.497 | 100.000 | |
| 102 | 48.832 | −18.645 | 100.000 | |
| 103 | 46.594 | −18.774 | 100.000 | |
| 104 | 44.355 | −18.890 | 100.000 | |
| 105 | 42.110 | −18.987 | 100.000 | |
| 106 | 39.871 | −19.058 | 100.000 | |
| 107 | 37.626 | −19.110 | 100.000 | |
| 108 | 35.387 | −19.135 | 100.000 | |
| 109 | 33.142 | −19.135 | 100.000 | |
| 110 | 30.897 | −19.103 | 100.000 | |
| 111 | 28.658 | −19.026 | 100.000 | |
| 112 | 26.419 | −18.903 | 100.000 | |
| 113 | 24.181 | −18.723 | 100.000 | |
| 114 | 21.955 | −18.471 | 100.000 | |
| 115 | 19.735 | −18.142 | 100.000 | |
| 116 | 17.529 | −17.729 | 100.000 | |
| 117 | 15.342 | −17.226 | 100.000 | |
| 118 | 13.181 | −16.626 | 100.000 | |
| 119 | 11.058 | −15.903 | 100.000 | |
| 120 | 8.987 | −15.045 | 100.000 | |
| 121 | 6.974 | −14.058 | 100.000 | |
| 122 | 5.045 | −12.910 | 100.000 | |
| 123 | 3.271 | −11.535 | 100.000 | |
| 124 | 1.748 | −9.897 | 100.000 | |
| 125 | 0.613 | −7.968 | 100.000 | |

Figure 6:
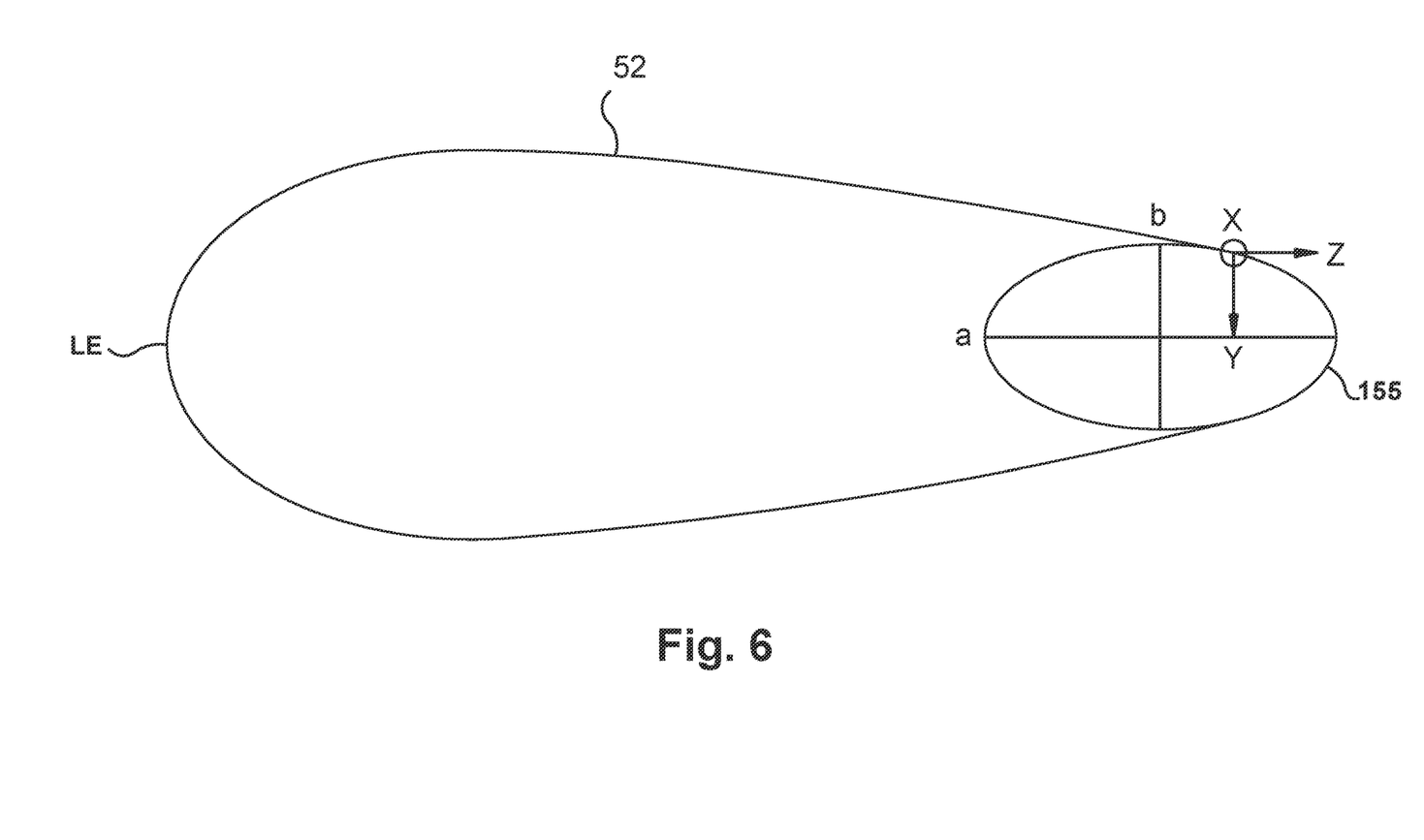
FIG. 6 is a schematic cross-sectional view of a part-span shroud with the elliptical trailing edge, according to aspects of the present disclosure.

Another aspect of the embodiments includes forming the part-span shroud with an elliptical trailing edge 155. As illustrated in FIGS. 5-7, elliptical trailing edge 155 is defined by an ellipsoid and provides a smooth transition from a top to a bottom surface of each part-span shroud at that trailing edge 155. The coordinates in TABLE I and TABLE II define the trailing edges 55 of the upper and lower part-span shroud 52, 53 as elliptical.

Elliptical trailing edge 155 of the part-span shroud, as embodied herein, can be defined by the standard equation for an ellipse, $x^2/a^2 + y^2/b^2 = 1$. Here a represents half the length of the major axis while b represents half the length of the minor axis. As illustrated in FIG. 6, the ellipsoid defines trailing edge 155 of part-span shroud 52, 53.

In certain aspects of the embodiments, the ratio of a:b is in a range from about 10:1 to about 1.5:1. In other aspects of the embodiments, the ratio of a:b is in a range from about 7:1 to about 1.5:1. In yet another aspect of the embodiments, the ratio of a:b is in a range from about 5:1 to about 1:1. Moreover, a further aspect of the embodiments provides the ratio of a:b is in a range from about 3:1 to about 1.25:1. A still further aspect of the embodiments herein provides the ratio of a:b at 3:1.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A blade, the blade comprising:
a platform;
an airfoil extending from the platform, the airfoil including a concave pressure sidewall and a convex suction sidewall extending axially between corresponding leading and trailing edges and radially between a root and an outboard tip, the blade further including:
at least one part-span shroud positioned on the airfoil, the at least one part-span shroud extending longitudinally in a Z direction from at least one of the concave pressure sidewall and the convex suction sidewall of the airfoil to a part-span shroud interface, the at least one part-span shroud being defined by a nominal profile in accordance with Cartesian coordinate values of X, Y and Z set forth in at least one of TABLE I and TABLE II, wherein the Cartesian coordinate values are non-dimensional values of from 0% to 100% convertible to distances by multiplying the values by a length of the at least one part-span shroud expressed in units of distance, and wherein X and Y values connected by smooth continuing arcs define the at least one part-span shroud profile sections at each distance Z along at least a portion of the at least one part-span shroud, the at least one part-span shroud profile sections at the Z distances being joined smoothly with one another to form the nominal profile.

2. The blade according to claim 1, wherein the at least one part-span shroud includes an outboard part-span shroud and an inboard part-span shroud, wherein the outboard part-span shroud is defined by the Cartesian coordinate values of TABLE I, and the inboard part-span shroud is defined by the Cartesian coordinate values of TABLE II.

3. The blade according to claim 2, wherein the inboard part-span shroud is disposed within a first range of radial distances defined on the airfoil, wherein the first range includes an inboard boundary at 40% of a radial distance of the airfoil and an outboard boundary at 60% of the radial distance of the airfoil; and wherein the outboard part-span shroud is disposed within a second range of radial distances defined on the airfoil, wherein the second range includes an inboard boundary at 75% of the radial distance of the airfoil and an outboard boundary at 95% of the radial distance of the airfoil.

4. The blade according to claim 2, wherein each of the outboard part-span shroud and the inboard part-span shroud include an elliptical trailing edge.

5. The blade according to claim 4, wherein each elliptical trailing edge is defined by:
$x^2/a^2+y^2/b^2=1$, where a represents half the length of the major axis while b represents half the length of the minor axis, and a:b is in a range from 10:1 to 1.5:1.

6. The blade according to claim 5, wherein a:b is in a range from 7:1 to 1.5:1.

7. The blade according to claim 5, wherein a:b is in a range from 5:1 to 1:1.

8. The blade according to claim 5, wherein a:b is 3:1.

9. The blade according to claim 1, wherein the blade further comprises a dovetail configured to be connected to a gas turbine.

10. A blade, the blade comprising:
a platform;
an airfoil extending from the platform, the airfoil including a concave pressure sidewall and a convex suction sidewall extending axially between corresponding leading and trailing edges and radially between a root and an outboard tip;
at least one part-span shroud positioned on the airfoil and extending longitudinally in a Z direction from at least one of the concave pressure sidewall and the convex suction sidewall of the airfoil, a trailing edge of the at least one part-span shroud being defined by $x^2/a^2+y^2/b^2=1$, where a represents half the length of the major axis while b represents half the length of the minor axis, and a:b is in a range from 10:1 to 1:1;
wherein the at least one part-span shroud includes an outboard part-span shroud and an inboard part-span shroud, wherein the outboard part-span shroud is defined by Cartesian coordinate values of X, Y and Z set forth in TABLE I and extends in the Z direction to an outboard part-span interface, and the inboard part-span shroud is defined by Cartesian coordinate values of X, Y and Z set forth set forth in TABLE II and extends in the Z direction to an inboard part-span interface.

11. The blade according to claim 10, wherein a:b is in a range from 7:1 to 1.5:1.

12. The blade according to claim 10, wherein a:b is in a range from 5:1 to 1:1.

13. The blade according to claim 10, wherein a:b is 3:1.

14. The blade according to claim 10, wherein the blade further comprises a dovetail configured to be connected to a gas turbine.

15. A blade, the blade comprising:
a platform;
an airfoil extending from the platform, the airfoil including a concave pressure sidewall and a convex suction sidewall extending axially between corresponding leading and trailing edges and radially between a root and an outboard tip;
an outboard part-span shroud extending longitudinally in a Z direction from at least one of the concave pressure sidewall and the convex suction sidewall of the airfoil to an outboard part-span interface; and
an inboard part-span shroud positioned on the airfoil extending longitudinally in the Z direction from the at least one of the concave pressure sidewall and the convex suction sidewall of the airfoil to an inboard part-span shroud interface,
wherein the outboard part-span shroud is defined by a nominal profile in accordance with Cartesian coordinate values of X, Y and Z set forth in TABLE I and the inboard part-span shroud is defined by a nominal profile in accordance with Cartesian coordinate values of X, Y and Z set forth in TABLE II;
wherein the Cartesian coordinate values are non-dimensional values of from 0% to 100% convertible to distances by multiplying the values by a length of each respective part-span shroud expressed in units of distance, and wherein X and Y values connected by smooth continuing arcs define respective part-span shroud profile sections at each distance Z along at least a portion of the at least one part-span shroud, the respective part-span shroud profile sections at the Z distances being joined smoothly with one another to form the nominal profile of the inboard part-span shroud and to form the nominal profile of the outboard part-span shroud, and wherein each of the outboard part-span shroud and the inboard part-span shroud includes an elliptical trailing edge, and wherein each elliptical trailing edge is defined by:

$x^2/a^2 + y^2/b^2 = 1$, where a represents half the length of the major axis while b represents half the length of the minor axis.

16. The blade according to claim 15, wherein a:b is 3:1.

17. The blade according to claim 15, wherein the blade further comprises a dovetail configured to be connected to a gas turbine.

* * * * *